US012656274B2

(12) United States Patent
Zhang et al.

(10) Patent No.: US 12,656,274 B2
(45) Date of Patent: Jun. 16, 2026

(54) DETECTION APPARATUS AND BATTERY PRODUCTION DEVICE

(71) Applicant: CONTEMPORARY AMPEREX TECHNOLOGY CO., LIMITED, Ningde (CN)

(72) Inventors: Fenglin Zhang, Ningde (CN); Jianlin Liu, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 19/294,028

(22) Filed: Aug. 7, 2025

(65) Prior Publication Data

US 2025/0362246 A1      Nov. 27, 2025

Related U.S. Application Data

(63) Continuation of application No. PCT/CN2024/070760, filed on Jan. 5, 2024.

(30) Foreign Application Priority Data

Jun. 30, 2023    (CN) .......................... 202310797652.1

(51) Int. Cl.
*G01N 23/04* (2018.01)
*G01B 15/06* (2006.01)

(52) U.S. Cl.
CPC ............. *G01N 23/04* (2013.01); *G01B 15/06* (2013.01); *G01N 2223/3303* (2013.01); *G01N 2223/401* (2013.01); *G01N 2223/646* (2013.01)

(58) Field of Classification Search
CPC ........ G01B 15/06; G01B 11/16; G01B 15/04; G01B 15/00; G01B 15/02; G01N 23/046;
(Continued)

(56) References Cited

U.S. PATENT DOCUMENTS 11,455,753 B1 * 9/2022 Alemi ..................... G06T 11/00
2019/0267677 A1 8/2019 Kahn
(Continued)

FOREIGN PATENT DOCUMENTS

CN        104076047 A      10/2014
CN        104122277 A      10/2014
(Continued)

OTHER PUBLICATIONS

International Search Report dated Apr. 18, 2024 for application PCT/CN2024/070760.
(Continued)

*Primary Examiner* — Irakli Kiknadze
(74) *Attorney, Agent, or Firm* — Ladas & Parry, LLP

(57) ABSTRACT

A detection apparatus and a battery production device are described. The detection apparatus includes a scanning frame, a radiation source, a detector, and a carrying platform. The radiation source and the detector are both connected to the scanning frame, and the detector is opposite an emission port of the radiation source. The carrying platform is located between the radiation source and the detector, where the radiation source and the detector can rotate around a same rotation axis, and a rotation direction of the radiation source is the same as a rotation direction of the detector, such that during rotation, the detector remains opposite the emission port of the radiation source, and the carrying platform is located between the radiation source and the detector. The carrying platform is configured to hold a to-be-tested battery. The detection apparatus can achieve detection of deformation of the to-be-tested battery.

16 Claims, 8 Drawing Sheets

(58) Field of Classification Search
CPC .............. G01N 23/04; G01N 2223/33; G01N 2223/401; G01N 2223/607; G01N 2223/3307; G01N 2223/419; G01N 23/18; G01N 23/20; G01N 23/207; G01N 23/20008; G01N 23/083; G01N 23/10; G01N 2223/643; G01N 2223/3303; G01N 2223/204; G01N 23/203; G01N 23/20066; G01N 2223/063; G01N 2223/053; G01N 23/20083; G01N 23/044; G01N 21/01; G01N 21/31; G01N 2223/6466; G01N 21/645; G01N 2201/064; G01N 2223/646; G01N 21/8851; G01N 21/95; G01N 21/88; G01N 2223/645; G01N 2223/3305; G01N 2223/309; G01N 2223/308; G01N 2223/306; G01N 2021/8887; G01N 2223/629; G01N 2223/61; H01M 10/4285; H01M 10/04; H01M 6/005; Y02E 60/10; G01V 5/226; G01V 5/00; G01V 5/232; A61B 6/032; A61B 6/4035; A61B 6/482; A61B 6/4233; A61B 6/4078; A61B 6/027; A61B 6/4441; A61B 6/587; A61B 6/4291; A61B 6/508; A61B 6/4028; G01T 1/023; G01T 7/00; G06T 17/00; G21K 1/00; G01J 3/108; G01J 5/0875; G01J 5/20; G01J 3/0256; G01J 3/0262; A61F 7/00; A61F 7/007; A61F 2007/0088; A61F 2007/0086; G01K 1/14; G01R 31/36

USPC .......................................... 378/4, 19, 57, 62
See application file for complete search history.

(56) References Cited

U.S. PATENT DOCUMENTS

| | | | | |
|---|---|---|---|---|
| 2021/0251594 A1* | 8/2021 | Kato | ...................... | A61B 6/032 |
| 2023/0258582 A1* | 8/2023 | Sakai | ................... | G01N 23/046 |
| | | | | 378/20 |
| 2024/0265519 A1* | 8/2024 | Shin | ...................... | G06T 7/0006 |

FOREIGN PATENT DOCUMENTS

| | | | |
|---|---|---|---|
| CN | 107693035 | A | 2/2018 |
| CN | 111552002 | A | 8/2020 |
| CN | 212433015 | U | 1/2021 |
| CN | 112964738 | A | 6/2021 |
| CN | 214893117 | U | 11/2021 |
| CN | 114062403 | A | 2/2022 |
| CN | 115097535 | A | 9/2022 |
| CN | 115508389 | A | 12/2022 |
| CN | 115825127 | A | 3/2023 |
| CN | 116148289 | A | 5/2023 |
| EP | 1820451 | A1 | 8/2007 |
| KR | 20090123633 | A | 12/2009 |

OTHER PUBLICATIONS

First Examination Opinion Notice in Chinese Application No. 202310797652.1, issued on Aug. 6, 2025.
Extended Search Report from corresponding European Patent Application No. 24829707.9 dated Apr. 13, 2026.

* cited by examiner

1000

100

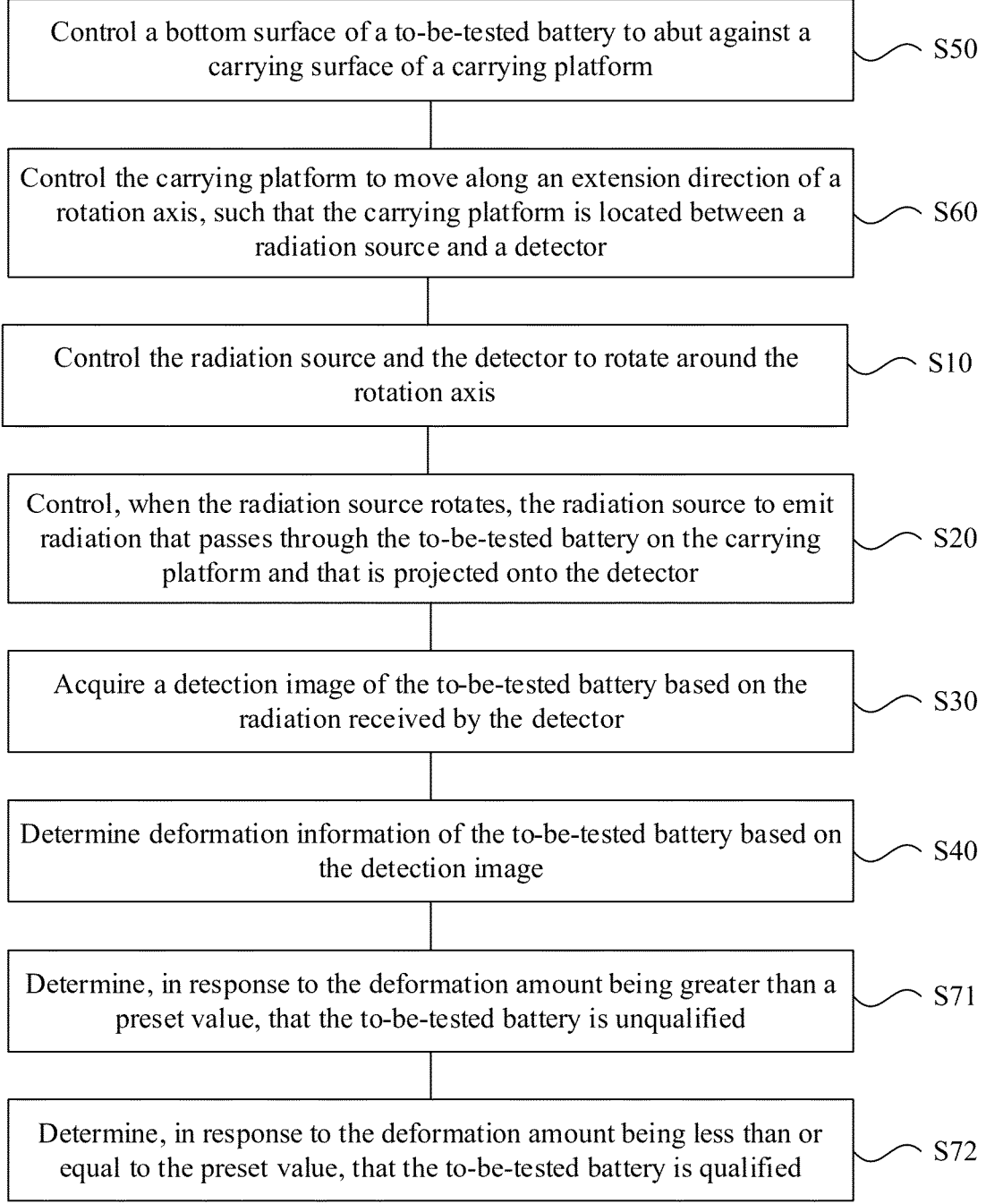

Control a bottom surface of a to-be-tested battery to abut against a carrying surface of a carrying platform — S50

Control the carrying platform to move along an extension direction of a rotation axis, such that the carrying platform is located between a radiation source and a detector — S60

Control the radiation source and the detector to rotate around the rotation axis — S10

Control, when the radiation source rotates, the radiation source to emit radiation that passes through the to-be-tested battery on the carrying platform and that is projected onto the detector — S20

Acquire a detection image of the to-be-tested battery based on the radiation received by the detector — S30

Determine deformation information of the to-be-tested battery based on the detection image — S40

Determine, in response to the deformation amount being greater than a preset value, that the to-be-tested battery is unqualified — S71

Determine, in response to the deformation amount being less than or equal to the preset value, that the to-be-tested battery is qualified — S72

DETECTION APPARATUS AND BATTERY PRODUCTION DEVICE

CROSS-REFERENCE TO RELATED APPLICATIONS

This application is a continuation of International application PCT/CN2024/070760 filed on Jan. 5, 2024 that claims the priority of Chinese Patent Application No. 202310797652.1, filed on Jun. 30, 2023. The content of these applications is incorporated herein by reference in its entirety.

TECHNICAL FIELD

This application relates to the field of battery technology, in particular, to a detection apparatus and a battery production device.

BACKGROUND

Energy conservation and emission reduction are key to the sustainable development of the automotive industry. Electric vehicles, due to their advantages of energy conservation and environmental friendliness, have become an important part of the sustainable development of the automotive industry. For electric vehicles, battery technology is an important factor in connection with their development.

During the use of a battery, the battery may be subjected to bumps or impacts, leading to battery deformation. The size of the external deformation of the battery can be directly measured using tools such as calipers, but it is impossible to determine whether internal deformation of the battery has occurred or to determine a size of the internal deformation. Excessive internal deformation of the battery may affect the safety of the battery. Therefore, how to detect internal deformation of the battery is an urgent problem to be solved.

SUMMARY

This application aims to at least solve one of the technical problems existing in the background art. To this end, an objective of this application is to provide a detection apparatus and a battery production device to detect internal deformation of a battery.

According to a first aspect, an embodiment of this application provides a detection apparatus for detecting battery deformation, including: a scanning frame; a radiation source connected to the scanning frame; a detector connected to the scanning frame, where the detector is opposite an emission port of the radiation source; and a carrying platform located between the radiation source and the detector, where the carrying platform is configured to hold a to-be-tested battery. The radiation source and the detector can rotate around a same rotation axis, and a rotation direction of the radiation source is the same as a rotation direction of the detector, such that during rotation, the detector remains opposite the emission port of the radiation source, and the carrying platform is located between the radiation source and the detector.

In the technical solution of this embodiment of this application, during use of the detection apparatus provided by this embodiment of this application, the to-be-tested battery can be placed on the carrying platform; and then the radiation source emits radiation that passes through the to-be-tested battery on the carrying platform and that is projected onto the detector, enabling scanning detection of the to-be-tested battery. During detection, the radiation source and the detector are controlled to rotate around the rotation axis. In addition, during rotation, the radiation source and the detector are controlled to rotate around the rotation axis, and during rotation, the radiation source and the detector can encircle the to-be-tested battery for detection, making the detection more comprehensive and, to some extent, avoiding incomplete detections. After the to-be-tested battery is detected, a deformation condition of the to-be-tested battery can be acquired based on the detection image, achieving comprehensive detection of the deformation of the to-be-tested battery.

In some embodiments, the scanning frame includes: a base having a mounting groove; and a scanning ring, at least partially located in the mounting groove, where the scanning ring can rotate around the rotation axis. The radiation source and the detector are both connected to the scanning ring, and the radiation source and the detector are located at two opposite ends of a diameter of the scanning ring. By configuring the scanning frame in the form of a base and a scanning ring and arranging the radiation source and the detector at two opposite ends of a diameter of the scanning ring respectively, relative positions of the radiation source and the detector remain unchanged during the rotation of the scanning ring, ensuring that the detector always remains opposite the emission port of the radiation source during rotation. The scanning ring is controlled to rotate so as to drive the radiation source and the detector to rotate, and the relative positions of the radiation source and the detector are fixed. Therefore, it is only necessary to rotate the scanning ring without considering a rotation speed and direction of the radiation source and the detector. In contrast, individually controlling the radiation source and the detector requires consideration of the rotation speed and direction of the radiation source and the detector. To be specific, in these embodiments of this application, the rotation of the radiation source and the detector is controlled by controlling the scanning ring, which is more convenient.

In some embodiments, the scanning frame further includes: a support wheel located in the mounting groove, where the support wheel is connected to the base, and an outer ring of the scanning ring abuts against the support wheel. The support wheel separates the base from the scanning ring. When the scanning ring rotates, the support wheel rolls, converting sliding friction between the base and the scanning ring into rolling friction between the support wheel and the scanning ring, which can reduce friction force and thus make the rotation of the scanning ring smoother.

In some embodiments, a rotation angle $\alpha$ of the radiation source satisfies: $\alpha \geq 180°$. During detection, since the radiation emitted by the radiation source can penetrate two opposite sides of the to-be-tested battery, only limiting the rotation angle $\alpha$ of the radiation source to be greater than or equal to 180° can ensure that, as much as possible, every part of the to-be-tested battery is detected, thereby reducing the likelihood of missed detections to some extent and improving the accuracy of deformation detection.

In some embodiments, the carrying platform is movably located between the radiation source and the detector, and a movement direction of the carrying platform is parallel to an extension direction of the rotation axis. The carrying platform being movably located between the radiation source and the detector allows for continuous detection of the battery by moving the carrying platform, improving the detection efficiency.

In some embodiments, the detection apparatus further includes: a controller, where the radiation source is electrically and/or communicatively connected to the controller, and the detector is electrically and/or communicatively connected to the controller. The controller is configured to: control the radiation source and the detector to rotate around the rotation axis; when the radiation source rotates, control the radiation source to emit radiation that passes through the to-be-tested battery on the carrying platform and that is projected onto the detector; acquire a detection image of the to-be-tested battery based on the radiation received by the detector; and determine deformation information of the to-be-tested battery based on the detection image. The method provided by these embodiments of this application can be used for detecting deformation of a to-be-tested battery, achieving automatic detection.

In some embodiments, when the scanning frame includes a base and a scanning ring, controlling the radiation source and the detector to rotate around the rotation axis includes configuring the controller to: control the scanning ring to rotate around the rotation axis. Since the radiation source and the detector are both connected to the scanning ring, controlling the scanning ring to rotate around the rotation axis enables the rotation of the radiation source and the detector.

In some embodiments, the to-be-tested battery includes a bottom surface, and the bottom surface has a gluing region. The controller is further configured to: control the bottom surface of the to-be-tested battery to be attached to a carrying surface of the carrying platform. The bottom surface of the to-be-tested battery being attached to the carrying surface of the carrying platform ensures that a state of the to-be-tested battery during detection is the same as a state when the to-be-tested battery is installed in a vehicle, thereby avoiding, to some extent, unforeseen defects such as internal structure misalignment due to upright placement or rotation of the to-be-tested battery, which affects the reliability of the battery.

In some embodiments, when the carrying platform can move along an extension direction of the rotation axis, the controller is further configured to: control the carrying platform to move along the extension direction of the rotation axis, such that the carrying platform is located between the radiation source and the detector. Positioning the carrying platform between the radiation source and the detector ensures that the radiation emitted by the radiation source can pass through the to-be-tested battery on the carrying platform and be projected onto the detector.

In some embodiments, acquiring the detection image of the to-be-tested battery based on the radiation received by the detector includes configuring the controller to: acquire multiple original images based on the radiation received by the detector; perform three-dimensional reconstruction on the multiple original images to obtain multiple cross-sectional detection images of the to-be-tested battery, where cross-sections of the multiple cross-sectional detection images are parallel and sequentially spaced along the extension direction of the rotation axis; and determine the detection image of the to-be-tested battery based on the multiple cross-sectional detection images. By using the above method, clearer detection images can be obtained, making it easier to identify the deformation amount of the to-be-tested battery.

In some embodiments, the determining the detection image of the to-be-tested battery based on the multiple cross-sectional detection images includes configuring the controller to: perform fuzzy processing on each of the multiple cross-sectional detection images to obtain multiple first images; perform convolution processing on each of the multiple first images to obtain multiple second images; and perform enhancement processing on each of the multiple second images to obtain the detection image of the to-be-tested battery. Processing the images using the above method makes it easier to identify deformation of the to-be-tested battery based on contour edges of the to-be-tested battery in the detection image.

In some embodiments, a distance between any two adjacent cross-sectional detection images in the multiple cross-sectional detection images is greater than or equal to 0.05 millimeter and less than or equal to 0.5 millimeter. If the distance between any two adjacent cross-sectional detection images is set to be too small, for example, less than 0.05 millimeter, the number of cross-sectional detection images processed is too large, leading to increased subsequent computational processes and affecting the detection efficiency. If the distance is set to be too large, for example, greater than 0.5 millimeter, it may cause that the part with a maximum deformation amount is neglected, leading to a significant error in a determined maximum deformation amount and affecting the detection accuracy. The range set in these embodiments of this application can, to some extent, prevent the maximum deformation amount from being neglected while improving the detection efficiency, thereby improving the detection accuracy.

In some embodiments, the determining the deformation information of the to-be-tested battery based on the detection image includes configuring the controller to: determine a deformation amount of the to-be-tested battery based on the detection image; and determine the deformation information of the to-be-tested battery based on the deformation amount. The deformation amount of the to-be-tested battery is a standard for determining whether the to-be-tested battery is qualified in the deformation detection, and the deformation information of the to-be-tested battery can be determined based on the deformation amount.

In some embodiments, the determining the deformation amount of the to-be-tested battery based on the detection image includes configuring the controller to: identify a bottom surface of the to-be-tested battery in the detection image; determine a distance between the bottom surface and a battery cell in the to-be-tested battery; and determine the deformation amount of the to-be-tested battery based on the distance. If internal deformation occurs in the to-be-tested battery, the distance between the bottom surface and the battery cell in the to-be-tested battery increases, and the deformation amount of the to-be-tested battery can be determined based on the distance between the bottom surface and the battery cell.

In some embodiments, the controller is further configured to: in response to the deformation amount being greater than a preset value, determine that the to-be-tested battery is unqualified. When the deformation amount is greater than the preset value, it indicates that the deformation of the to-be-tested battery is excessive, which affects the stability of the to-be-tested battery, and it is determined that the to-be-tested battery is unqualified.

In some embodiments, the preset value is greater than or equal to 1 millimeter and less than or equal to 3 millimeters. If the deformation amount of the battery is small, its impact on battery reliability is minimal. If the preset value is set to be too small, for example, less than 1 millimeter, it may cause that too many batteries are deemed unqualified, affecting the yield of the battery. If the preset value is set to be too large, for example, greater than 3 millimeters, it may result in significant deformation in the battery, affecting the reliability of the battery. Setting the preset value to be greater than or equal to 1 millimeter and less than or equal to 3 millimeters guarantees the yield of the battery to some extent and can also improve the reliability of the battery.

According to a second aspect, an embodiment of this application provides a battery production device including the detection apparatus in the above embodiments.

The above description is only an overview of the technical solutions of this application. To enable a clearer understanding of the technical means of this application and implementation in accordance with the content of the specification, and to make the above and other objectives, features, and advantages of this application more apparent and understandable, specific embodiments of this application are provided below.

BRIEF DESCRIPTION OF DRAWINGS

In the accompanying drawings, unless otherwise specified, identical reference signs throughout multiple drawings indicate the same or similar components or elements. These accompanying drawings may not necessarily be drawn to scale. It should be understood that these accompanying drawings illustrate only some embodiments disclosed in this application and should not be construed as limitations on the scope of this application. To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

FIG. 9 is a control flowchart of a controller according to some embodiments of this application;

DETAILED DESCRIPTION

Figure 1:
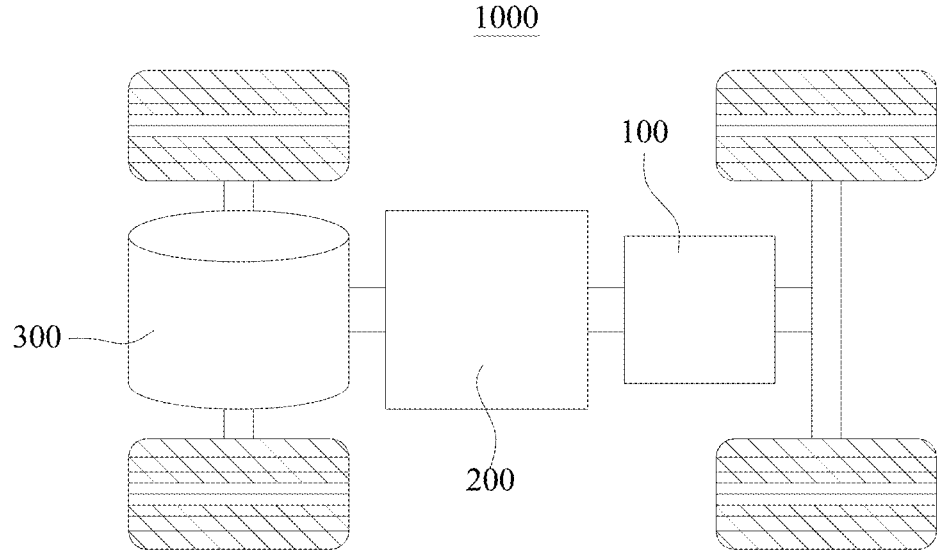
FIG. 1 is a schematic structural diagram of a vehicle according to some embodiments of this application.

The embodiments of the technical solutions of this application will be described in detail below with reference to the accompanying drawings. The following embodiments are merely intended for a clearer description of the technical solutions of this application and therefore are only used as examples, which do not constitute any limitations on the protection scope of this application.

Unless otherwise defined, all technical and scientific terms used herein have the same meaning as commonly understood by persons skilled in the technical field of this application; the terms used herein are only for the purpose of describing specific embodiments and are not intended to limit this application; the terms "include", "comprise", and any variations thereof in the specification, claims, and descriptions of the accompanying drawings of this application are intended to cover non-exclusive inclusion.

In the description of the embodiments of this application, technical terms such as "first" and "second" are used only to distinguish between different objects and should not be understood as indicating or implying relative importance or implicitly indicating the number, specific order, or primary-secondary relationship of the technical features indicated. In the description of the embodiments of this application, "multiple" means two or more, unless otherwise explicitly and specifically defined.

In this specification, reference to "embodiment" means that specific features, structures, or characteristics described with reference to the embodiment may be included in at least one embodiment of this application. The appearance of this phrase in various places in the specification does not necessarily refer to the same embodiment, nor is it an independent or alternative embodiment mutually exclusive with other embodiments. Persons skilled in the art explicitly and implicitly understand that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" herein generally indicates that the contextually associated objects are in an "or" relationship.

In the description of the embodiments of this application, the term "multiple" refers to two or more (including two), similarly, "multiple groups" refers to two or more groups (including two groups), and "multiple pieces" refers to two or more pieces (including two pieces).

In the description of the embodiments of this application, the orientations or positional relationships indicated by technical terms such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitation on the embodiments of this application.

In the description of the embodiments of this application, unless otherwise explicitly specified and defined, technical terms such as "mounting", "connection", "joint", and "fastening" should be understood in a broad sense. For example, it may be a fixed connection, a detachable connection, or an integral formation; it may be a mechanical connection or an electrical connection; it may be a direct connection or an indirect connection through an intermediate medium; and it may be an internal communication between two elements or an interaction relationship between two elements. For persons of ordinary skill in the art, the specific meanings of the above terms in the embodiments of this application can be understood based on specific circumstances.

Currently, from the perspective of market development, the application of traction batteries is becoming increasingly widespread. Traction batteries are not only used in energy storage power systems such as hydropower, thermal power, wind power, and solar power stations but are also widely applied in electric vehicles such as electric bicycles, electric motorcycles, and electric cars, as well as in military equipment, aerospace, and other fields. As the application fields of traction batteries continue to expand, their market demand is also continuously increasing.

During the use of a battery, the battery may be subjected to bumps or impacts, leading to external deformation of the battery. Excessive deformation may also cause internal deformation of the battery. External deformation of the battery can be directly observed, and the size of the deformation can be measured using measuring tools such as calipers. However, internal deformation of the battery cannot be directly observed, and the size of the internal deformation is even more difficult to observe. A small size of the internal deformation of the battery does not affect the reliability of the battery, meaning that the battery can still be used. However, an excessively large size of the internal deformation of the battery may affect the reliability of the battery. After external deformation of the battery, since the internal deformation of the battery cannot be known, discarding the battery directly may cause significant waste, but continuing to use the battery may pose a risk of affecting the reliability of the battery due to excessively large internal deformation of the battery.

An embodiment of this application provides a detection apparatus, where a to-be-tested battery is placed on a carrying platform; radiation emitted by a radiation source passes through the to-be-tested battery on the carrying platform and is projected onto a detector; and the radiation source and the detector are rotated, such that during rotation, the radiation source and the detector can detect the entire to-be-tested battery, thereby achieving comprehensive detection of battery deformation.

The detection apparatus and a battery production device disclosed in the embodiments of this application can be used in the battery manufacturing process, and the detected or produced batteries can be used, but are not limited to, in electric apparatuses such as vehicles, ships, or aircraft. The battery disclosed in this application may be used to constitute a power supply system of the electric apparatus.

An embodiment of this application provides an electric apparatus using a battery as a power source, where the electric apparatus may include, but is not limited to, a mobile phone, a tablet, a laptop, an electric toy, an electric tool, an electric bicycle, an electric vehicle, a ship, and a spacecraft. The electric toy may be a fixed or mobile electric toy, for example, a game console, an electric toy car, an electric toy ship, or an electric toy airplane. The spacecraft may include an airplane, a rocket, a space shuttle, a spaceship, and the like.

For ease of description, an example in which an electric apparatus in an embodiment of this application is a vehicle 1000 is used for description.

Referring to FIG. 1, FIG. 1 is a schematic structural diagram of a vehicle according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. A battery 100 is provided inside the vehicle 1000, and the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, for the operational power requirements during starting, navigation, and driving of the vehicle 1000.

In some embodiments of this application, the battery 100 can be used not only as the operational power source for the vehicle 1000 but also as a driving power source for the vehicle 1000, replacing or partially replacing fossil fuel or natural gas to provide driving traction for the vehicle 1000.

Figure 2:
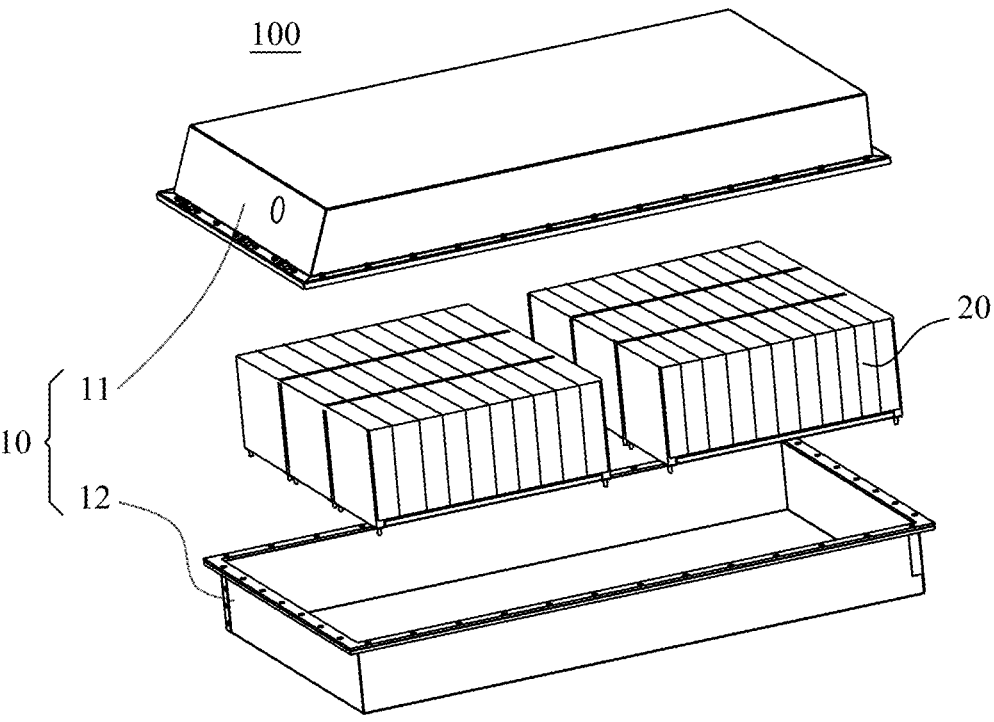
FIG. 2 is an exploded view of a battery according to some embodiments of this application.

Referring to FIG. 2, FIG. 2 is an exploded view of a battery according to some embodiments of this application. The battery 100 includes a box 10 and a battery cell 20, where the battery cell 20 is accommodated in the box 10. The box 10 is configured to provide an accommodating space for the battery cell 20. The box 10 may have various structures. In some embodiments, the box 10 may include a first part 11 and a second part 12, where the first part 11 and the second part 12 are engaged with each other, and the first part 11 and the second part 12 jointly define the accommodating space for accommodating the battery cell 20. The second part 12 may be a hollow structure with an opening at one end, and the first part 11 may be a plate-like structure, where the first part 11 covers the opening side of the second part 12, such that the first part 11 and the second part 12 jointly define the accommodating space. Alternatively, both the first part 11 and the second part 12 may be hollow structures with an opening at one side, where the opening side of the first part 11 covers the opening side of the second part 12. Certainly, the box 10 formed by the first part 11 and the second part 12 may be of various shapes, such as a cylinder and a cuboid.

In the battery 100, there may be multiple battery cells 20, and the multiple battery cells 20 may be connected in series, in parallel, or in series-parallel, where being connected in series-parallel means a combination of a series connection and a parallel connection of the multiple battery cells 20. The multiple battery cells 20 may be directly connected in series, in parallel, or in series-parallel, and then an entirety of the multiple battery cells 20 is accommodated in the box 10. Certainly, the battery 100 may alternatively be formed in a manner that multiple battery cells 20 are connected in series, in parallel, or in series-parallel first to form a battery module, and then multiple battery modules are connected in series, in parallel, or in series-parallel to form an entirety which is accommodated in the box 10. The battery 100 may further include another structure. For example, the battery 100 may further include a busbar configured to implement electrical connection between the multiple battery cells 20.

Each battery cell 20 may be a secondary battery or a primary battery; and it may also be a lithium-sulfur battery, a sodium-ion battery, or a magnesium-ion battery, but is not limited thereto. The battery cell 20 may be cylindrical, flat, cuboid, or of other shapes.

Figure 3:
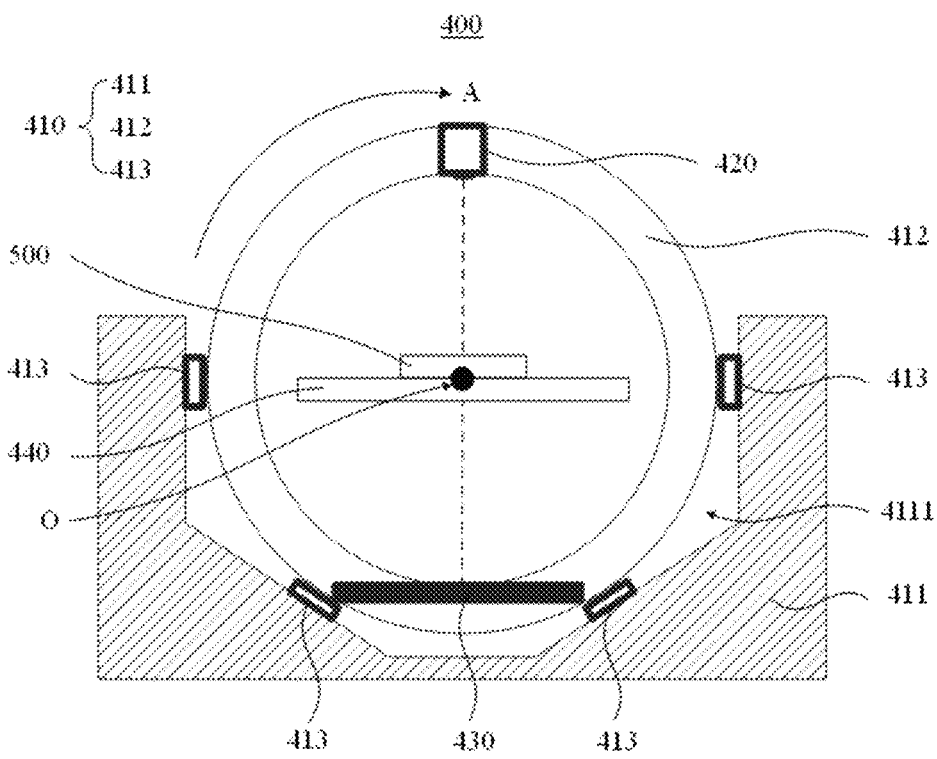
FIG. 3 is a front view of a detection apparatus according to some embodiments of this application.

An embodiment of this application provides a detection apparatus for detecting battery deformation. FIG. 3 is a front view of a detection apparatus according to some embodiments of this application. Referring to FIG. 3, the detection apparatus 400 includes a scanning frame 410, a radiation source 420, a detector 430, and a carrying platform 440. The radiation source 420 and the detector 430 are both connected to the scanning frame 410, and the detector 430 is opposite an emission port of the radiation source 420. The carrying platform 440 is located between the radiation source 420 and the detector 430, where the radiation source 420 and the detector 430 can rotate around a same rotation axis O, and a rotation direction of the radiation source 420 is the same as a rotation direction of the detector 430, such that during rotation, the detector 430 remains opposite the emission port of the radiation source 420, and the carrying platform 440 is located between the radiation source 420 and the detector 430. For ease of explanation and description, FIG. 3 also shows a to-be-tested battery 500, and the carrying platform 440 is configured to hold the to-be-tested battery 500.

The scanning frame 410 may be any component for mounting the radiation source 420 and the detector 430 to enhance the stability of the radiation source 420 and the detector 430. The scanning frame 410 may be configured to fix the radiation source 420 and the detector 430. When the radiation source 420 and the detector 430 are mounted on the scanning frame 410, the detector 430 can be opposite the emission port of the radiation source 420, so that radiation emitted by the radiation source 420 can pass through the to-be-tested battery 500 on the carrying platform 440 and be projected onto the detector 430, enabling detection of the to-be-tested battery 500.

The radiation source 420 is an apparatus for emitting detection radiation, mainly including a radiation tube, a cooling system, and a corresponding control system. The detection radiation may be X-rays or other types of radiation, and the radiation tube can emit corresponding detection radiation, such as X rays or γ rays. In one example, the radiation source 420 is a linear electron accelerator, and the detection radiation emitted by the radiation source 420 is X-rays. When the detection radiation emitted by the radiation source 420 passes through the to-be-tested battery 500, due to differences in thickness or material in different regions of the to-be-tested battery 500, an absorption rate of X-rays varies, allowing for detection of different X-ray absorption degrees based on the different absorption rates.

The radiation emitted by the radiation source 420 is penetrative, and materials of different thicknesses attenuate the radiation to varying degrees, resulting in different amounts of radiation detected by the detector 430. The detector 430 includes a layer of radiation-sensitive luminescent material that emits visible light signals under radiation excitation. The visible light signals are transmitted to a photoelectric converter to form electrical signals, which are then outputted as digital signals through an internal electrical signal transmission circuit and characterized on an image to form an image with light and dark contrast. After passing through an object being detected, the radiation undergoes some attenuation. When more radiation passes through the object, more luminescent signals are produced by the photosensitive material, so that this region is brighter in the final image. Conversely, when less radiation passes through the object, this region is darker in the image. The detector 430 may be a flat-panel detector or a linear array detector, which is not limited in the embodiments of this application.

The carrying platform 440 may be any carrying structure that can fix the to-be-tested battery 500 in a supporting or clamping manner, such as a tray, a gripper, or the like. The carrying platform 440 may be fixed or movable, for example, a tray or clamping mechanism provided with a conveying track and moving along the conveying track.

There may be one or multiple to-be-tested batteries 500 carried on the carrying platform 440. In one example, the carrying platform 440 may include multiple trays, with each tray carrying one or multiple to-be-tested batteries 500. The to-be-tested battery 500 may be a battery 100 including multiple battery cells 20.

In this embodiment of this application, the load-bearing capacity of the carrying platform 440 is greater than the weight of the to-be-tested battery 500 placed thereon.

In this embodiment of this application, thicknesses of all regions of the carrying platform 440 are equal, reducing an impact on the detection results. In this embodiment of this application, the radiation source 420 and the detector 430 can rotate around a same rotation axis O, which may mean that the radiation source 420 and the detector 430 rotate on the scanning frame 410, or the scanning frame 410 rotates to drive the radiation source 420 and the detector 430 to rotate.

In this embodiment of this application, when the radiation source 420 and the detector 430 rotate, it is necessary to ensure that the carrying platform 440 is located between the radiation source 420 and the detector 430, so that during detection, the radiation emitted by the radiation source 420 can pass through the to-be-tested battery 500 on the carrying platform 440 and be projected onto the detector 430. As shown in FIG. 3, the rotation axis O can be positioned on a carrying surface of the carrying platform 440, ensuring that the carrying platform 440 always remains between the radiation source 420 and the detector 430 during rotation of the radiation source 420 and the detector 430. The radiation source 420 and the detector 430 may rotate clockwise or rotate counterclockwise.

The rotation axis O is a virtual line, not a physically existing line. In FIG. 3, the rotation axis O is a direction perpendicular to the plane of the figure, so in FIG. 3, the rotation axis O is represented by a dot.

During use of the detection apparatus provided by this embodiment of this application, the to-be-tested battery 500 can be placed on the carrying platform 440, and then the radiation source 420 emits radiation that passes through the to-be-tested battery 500 on the carrying platform 440 and that is projected onto the detector 430, enabling scanning detection of the to-be-tested battery 500. During detection, the radiation source 420 and the detector 430 are controlled to rotate around the rotation axis O. In addition, during rotation, the radiation source 420 and the detector 430 can encircle the to-be-tested battery 500 for detection, making the detection more comprehensive and, to some extent, avoiding missed detections. After the to-be-tested battery 500 is detected, a deformation condition of the to-be-tested battery 500 can be obtained based on a detection image, achieving comprehensive detection of the deformation of the to-be-tested battery 500.

While being used to detect the to-be-tested battery 500, the detection apparatus provided by this embodiment of this application can implement non-destructive detection of the to-be-tested battery 500 without disassembling the to-be-tested battery 500.

According to some embodiments of this application, referring to FIG. 3, the scanning frame 410 includes a base 411 and a scanning ring 412. The base 411 has a mounting groove 4111, and at least a portion of the scanning ring 412 is located in the mounting groove 4111. The scanning ring 412 can rotate around the rotation axis O, where the radiation source 420 and the detector 430 are both connected to the scanning ring 412, and the radiation source 420 and the detector 430 are located at two opposite ends of a diameter of the scanning ring 412.

The base 411 provides support for the entire detection apparatus, improving the stability of the entire detection apparatus. A material of the base 411 is not limited and may be metal or non-metal.

As shown in FIG. 3, a cross-section of the mounting groove 4111 is hexagonal and symmetrically distributed. In other implementations, the cross-section of the mounting groove 4111 may be of other shapes, such as circular or square.

The scanning ring 412 is annular and rotatable, and the scanning ring 412 can rotate counterclockwise or rotate clockwise. The radiation source 420 and the detector 430 are located at two opposite ends of a diameter of the scanning ring 412, enabling the radiation emitted by the radiation source 420 to be projected onto the detector 430.

In these embodiments of this application, the scanning frame 410 is configured in the form of a base 411 and a scanning ring 412, with the radiation source 420 and the detector 430 being arranged at two opposite ends of a diameter of the scanning ring 412. During the rotation of the scanning ring 412, relative positions of the radiation source 420 and the detector 430 remain unchanged, ensuring that the detector 430 always remains opposite an emission port of the radiation source 420 during rotation. The scanning ring 412 is controlled to rotate so as to drive the radiation source 420 and the detector 430 to rotate, and the relative positions of the radiation source 420 and the detector 430 are fixed. Therefore, it is only necessary to rotate the scanning ring 412 without considering a rotation speed and direction of the radiation source 420 and the detector 430. In contrast, individually controlling the radiation source 420 and the detector 430 requires consideration of the rotation speed and direction of the radiation source 420 and the detector 430. To be specific, in these embodiments of this application, the rotation of the radiation source 420 and the detector 430 is controlled by controlling the scanning ring 412, which is more convenient.

According to some embodiments of this application, referring to FIG. 3, the scanning frame 410 further includes a support wheel 413, the support wheel 413 is located in the mounting groove 4111, the support wheel 413 is connected to the base 411, and an outer ring of the scanning ring 412 abuts against the support wheel 413.

In these embodiments of this application, since the outer ring of the scanning ring 412 abuts against the support wheel 413, the support wheel 413 can provide support for the scanning ring 412, and when the scanning ring 412 rotates, the support wheel 413 can rotate without affecting the rotation of the scanning ring 412.

In some embodiments of this application, the support wheel 413 may be directly bonded to an inner wall of the mounting groove 4111, or the support wheel 413 may be fixedly connected to the inner wall of the mounting groove 4111 by a screw.

The position and number of the support wheel 413 can be set according to requirements. As shown in FIG. 3, four inner walls of the mounting groove 4111 are each provided with one support wheel 413, and the support wheels 413 are symmetrically distributed, ensuring that a supporting force of the scanning ring 412 is evenly distributed, thereby improving the stability of the scanning ring 412. In other implementations, the position and number of the support wheels 413 may be set in another manner, which is not limited in the embodiments of this application.

In these embodiments of this application, the support wheel 413 separates the base 411 from the scanning ring 412. When the scanning ring 412 rotates, the support wheel 413 rolls, converting sliding friction between the base 411 and the scanning ring 412 into rolling friction between the support wheel 413 and the scanning ring 412, which can reduce friction force and thus make the rotation of the scanning ring 412 smoother.

Figure 4:
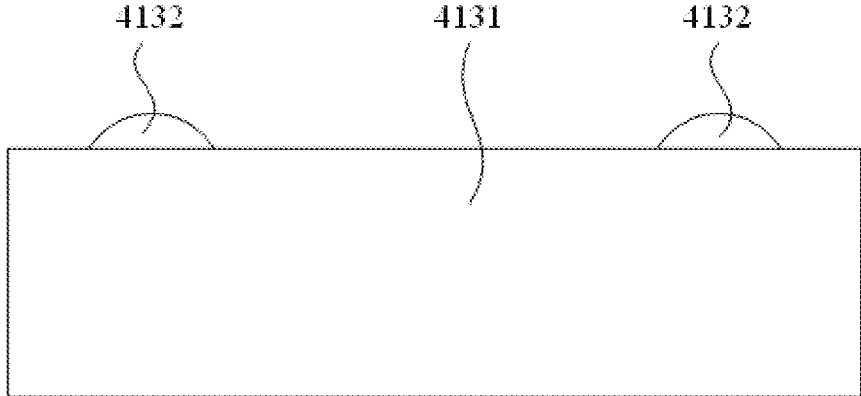
FIG. 4 is a front view of a support wheel according to some embodiments of this application.

In some embodiments of this application, FIG. 4 is a front view of a support wheel according to some embodiments of this application. The support wheel 413 includes a support block 4131 and a roller wheel 4132. A portion of the roller wheel 4132 is located inside the support block 4131, and another portion of the roller wheel 4132 extends out of the support block 4131. The roller wheel 4132 is rollable, the support block 4131 is configured to be connected to the base 411, and the roller wheel 4132 is configured to roll when the scanning ring 412 rotates, to avoid affecting the rotation of the scanning ring 412.

In some other embodiments of this application, the support wheel 413 may include only a roller wheel, and a side wall of the mounting groove 4111 has a groove. A portion of the roller wheel is located in the groove, and another portion of the roller wheel extends out of the groove. The roller wheel is rotatable, and the roller wheel abuts against the outer ring of the scanning ring 412. To be specific, the support block 4131 is directly omitted, making the structure of the detection apparatus simpler.

According to some embodiments of this application, a rotation angle $\alpha$ of the radiation source 420 satisfies: $\alpha \geq 180°$.

Figure 5:
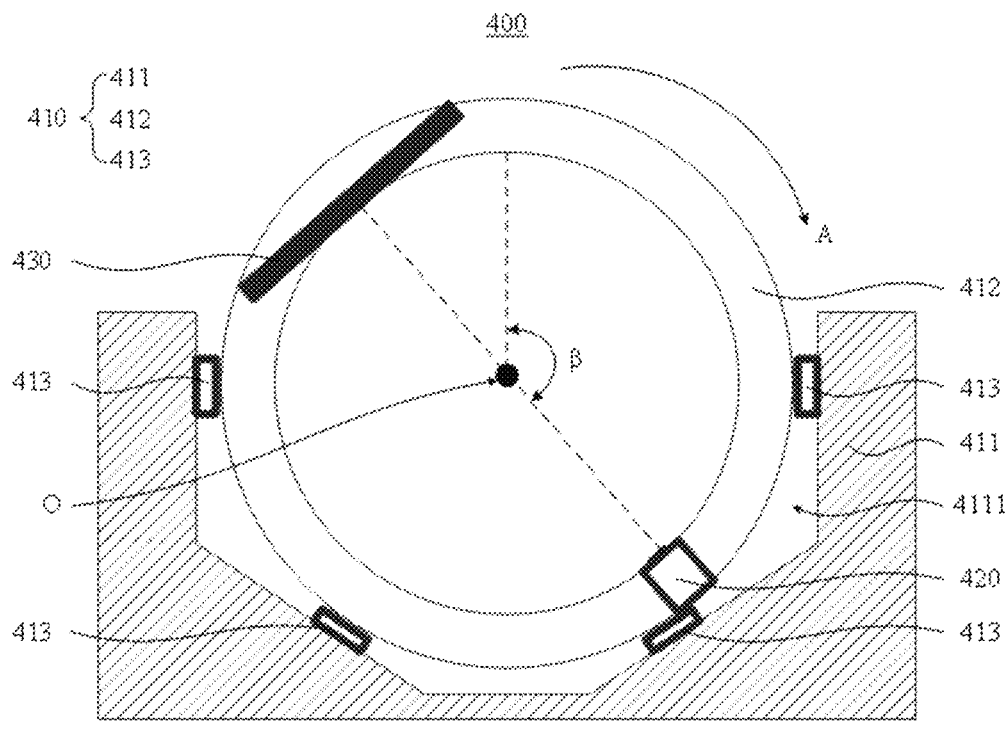
FIG. 5 is a front view of a detection apparatus in another state according to some embodiments of this application.
Figure 6:
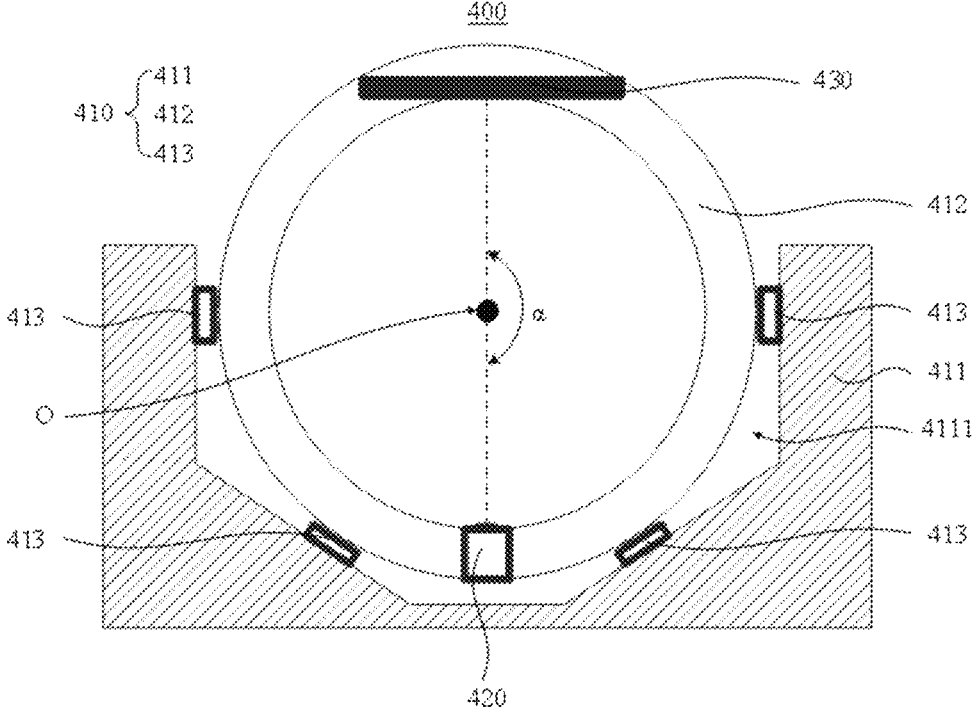
FIG. 6 is a front view of a detection apparatus in still another state according to some embodiments of this application.

FIG. 5 is a front view of a detection apparatus in another state according to some embodiments of this application. FIG. 6 is a front view of a detection apparatus in still another state according to some embodiments of this application. The detection apparatus shown in FIG. 3, after the scanning ring 412 rotates along a rotation direction A by a certain angle $\beta$, becomes the detection apparatus shown in FIG. 5. The detection apparatus shown in FIG. 3, after the scanning ring 412 further rotates along a rotation direction A by a certain angle, becomes the detection apparatus shown in FIG. 6. The detection apparatus shown in FIG. 3, after the scanning ring 412 rotates a total angle $\alpha$, becomes detection apparatus shown in FIG. 6. It should be noted that, in FIG. 5 and FIG. 6, to clearly illustrate the rotation angle of the detection apparatus, the carrying platform 440 and the to-be-tested battery 500 are omitted.

In these embodiments of this application, since the scanning ring 412 can rotate back and forth, the radiation source 420 can rotate in two opposite directions.

The rotation angle $\alpha$ of the radiation source 420 in these embodiments of this application refers to a maximum angle that the radiation source 420 rotates during detection rather than a maximum angle that the radiation source 420 can rotate, which does not mean that all rotation angles of the scanning ring 412 during detection need to be greater than or equal to 180°. Taking FIG. 3, FIG. 5, and FIG. 6 as examples, assuming that $\alpha=180°$, FIG. 3 shows a state before detection begins, and FIG. 6 shows a maximum angle that the scanning ring 412 rotates during detection, where the maximum angle is equal to 180° at that time. However, the scanning ring 412 in the detection apparatus shown in FIG. 6 can still rotate in direction A. FIG. 5 shows an intermediate state, where $\beta<180°$. During detection, the rotation angle of the scanning ring 412 in a certain state may be less than 180°.

The detection apparatus of these embodiments of this application is used to detect a deformation condition of the to-be-tested battery 500, where the deformation of the to-be-tested battery 500 may occur in any part of the to-be-tested battery 500. During detection, since the radiation emitted by the radiation source 420 can penetrate two opposite sides of the to-be-tested battery 500, only limiting the rotation angle α of the radiation source 420 to be greater than or equal to 180° can ensure that, as much as possible, every part of the to-be-tested battery 500 is detected, thereby reducing the likelihood of missed detections to some extent and improving the accuracy of deformation detection.

According to some embodiments of this application, the carrying platform 440 is movably located between the radiation source 420 and the detector 430, and a movement direction of the carrying platform 440 is parallel to an extension direction of the rotation axis O.

In other implementations of this application, the carrying platform 440 may be a conveying belt, or the carrying platform 440 may be an annular guide rail or the like.

For example, when the carrying platform 440 is an annular guide rail, a tray on the annular guide rail may be made of carbon fiber, which can reduce the impact on detection.

The detection apparatus provided by these embodiments of this application can be placed after the battery manufacturing process. The manufactured battery is directly transported to a position between the radiation source 420 and the detector 430 via the carrying platform 440 for detection. After detection is completed, the battery is transported to a next process via the carrying platform 440. In other implementations, the to-be-tested battery 500 may be moved onto the carrying platform 440 by a mechanical gripper or crane.

The movement direction of the carrying platform 440 is parallel to the extension direction A of the rotation axis O, ensuring that the movement of the carrying platform 440 does not interfere with the scanning ring 412.

In these embodiments of this application, the carrying platform 440 being movably located between the radiation source 420 and the detector 430 allows for continuous detection of the battery by moving the carrying platform 440, improving the detection efficiency.

Figure 7:
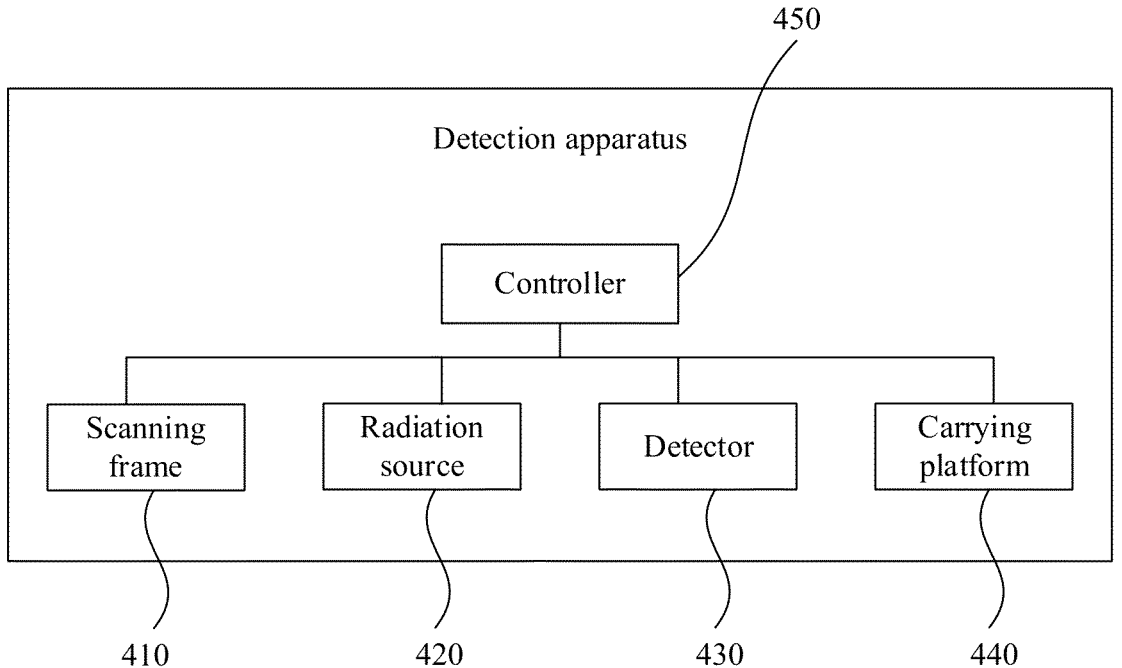
FIG. 7 is a block diagram of a detection apparatus according to some embodiments of this application.

According to some embodiments of this application, FIG. 7 is a block diagram of a detection apparatus according to some embodiments of this application. The detection apparatus further includes a controller 450, where the radiation source 420 is electrically and/or communicatively connected to the controller 450, and the detector 430 is electrically and/or communicatively connected to the controller 450.

Figure 8:
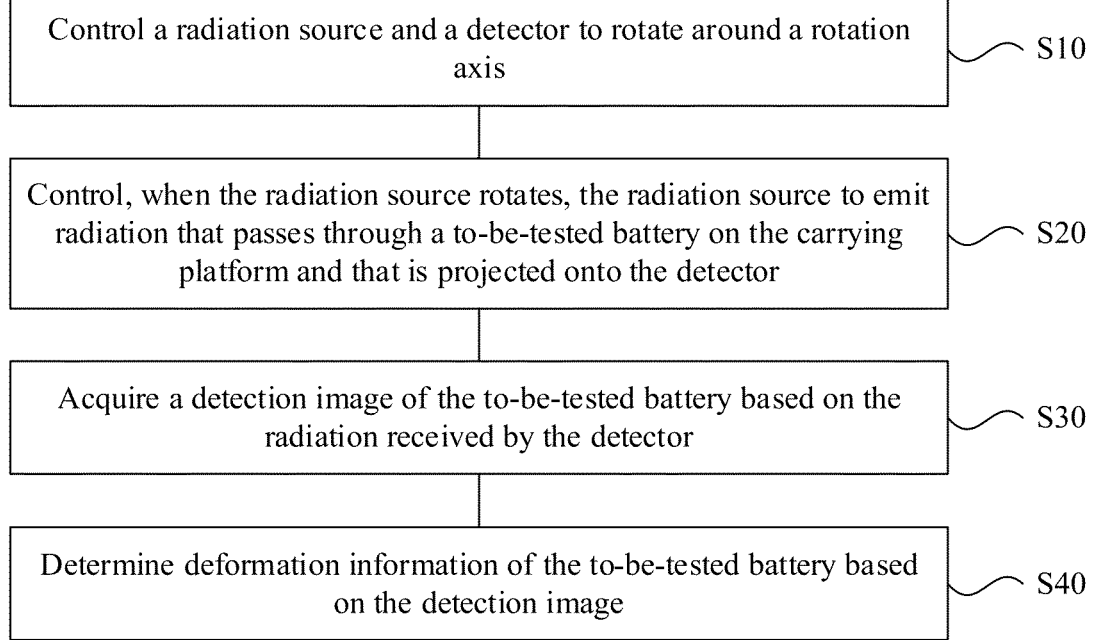
FIG. 8 is a control flowchart of a controller according to some embodiments of this application.

FIG. 8 is a control flowchart of a controller according to some embodiments of this application. Referring to FIG. 8, the controller 450 is configured to perform the following steps.

Step S10: Control the radiation source and the detector to rotate around the rotation axis.

Step S20: When the radiation source rotates, control the radiation source to emit radiation that passes through the to-be-tested battery on the carrying platform and that is projected onto the detector.

Step S30: Acquire a detection image of the to-be-tested battery based on the radiation received by the detector.

Step S40: Determine deformation information of the to-be-tested battery based on the detection image.

In some embodiments of this application, the controller 450 may include a memory and a processor, where the memory is configured to store instructions, and the processor is configured to read the instructions and execute commands based on the instructions.

In these embodiments of this application, before detection begins, the detector 430 needs to be calibrated to reduce errors of the detection image. For example, before formal operation, the detector 430 needs to be calibrated. Before calibration, there should be no foreign objects on the emission port of the radiation source 420 and the surface of the detector 430 as well as no obstructions between the radiation source 420 and the detector 430. The radiation should fully cover a receiving surface of the detector 430, and a grayscale value for imaging the detection apparatus at that time can be adjusted to a calibration grayscale value.

For example, when the detection apparatus is used to detect the to-be-tested battery 500, the to-be-tested battery 500 can be placed on the carrying platform 440, such that a large surface of the to-be-tested battery 500 is attached to a carrying surface of the carrying platform 440, that is, a thickness direction of the to-be-tested battery 500 is perpendicular to the carrying surface. Then, the radiation source 420 and the detector 430 are used to detect the to-be-tested battery 500.

In these embodiments of this application, the deformation information of the to-be-tested battery 500 may be used for indicating whether the deformation of the to-be-tested battery 500 is qualified.

In these embodiments of this application, if there is internal deformation in the to-be-tested battery 500, a boundary of a deformed part of the battery changes, and the boundary change of the deformed part can be observed in the detection image, thereby determining the deformation information of the to-be-tested battery 500.

The method provided by these embodiments of this application can be used for detecting deformation of the to-be-tested battery 500, achieving automatic detection.

According to some embodiments of this application, when the scanning frame 410 includes a base 411 and a scanning ring 412, step S10 includes configuring the controller to perform the following step.

Step S11: Control the scanning ring to rotate around the rotation axis.

In these embodiments of this application, since the radiation source 420 and the detector 430 are both connected to the scanning ring 412, controlling the scanning ring 412 to rotate around the rotation axis O enables the rotation of the radiation source 420 and the detector 430.

In some embodiments of this application, the scanning frame 410 may be electrically and/or communicatively connected to the controller 450, enabling the controller 450 to control the sliding of the scanning frame 410.

According to some embodiments of this application, the to-be-tested battery 500 includes a bottom surface, and the bottom surface has a gluing region. FIG. 9 is a control flowchart of a controller according to some embodiments of this application. Referring to FIG. 9, the controller 450 is further configured to perform the following step.

Step S50: Control the bottom surface of the to-be-tested battery to be attached to the carrying surface of the carrying platform.

The to-be-tested battery 500 has a shape similar to a cuboid, and the to-be-tested battery 500 has two oppositely disposed large surfaces and four side surfaces connecting the two large surfaces. The large surfaces are a top surface and the bottom surface of the to-be-tested battery, where the top surface and the bottom surface are respectively located at a first part 11 and a second part 12 of the box 10. The bottom surface has a gluing region, the gluing region includes glue for bonding a battery cell, and the bottom surface of the to-be-tested battery 500 can be identified through the gluing region. For example, if the bottom surface is located at the second part 12, the second part 12 has a gluing region.

In these embodiments of this application, the bottom surface of the to-be-tested battery 500 being attached to the carrying surface of the carrying platform ensures that a state of the to-be-tested battery 500 during detection is the same as a state when the to-be-tested battery is installed in a vehicle, thereby avoiding, to some extent, unforeseen defects such as internal structure misalignment due to upright placement or rotation of the to-be-tested battery 500, which affects the reliability of the battery.

According to some embodiments of this application, when the carrying platform can move along the extension direction of the rotation axis O, referring to FIG. 9, the controller is further configured to perform the following step.

Step S60: Control the carrying platform to move along the extension direction of the rotation axis, such that the carrying platform is located between the radiation source and the detector.

Positioning the carrying platform 440 between the radiation source 420 and the detector 430 ensures that the radiation emitted by the radiation source 420 can pass through the to-be-tested battery on the carrying platform 440 and be projected onto the detector 430.

In some embodiments of this application, the carrying platform 440 may be electrically and/or communicatively connected to the controller 450, enabling the controller 450 to control the movement of the carrying platform 440.

Figure 10:
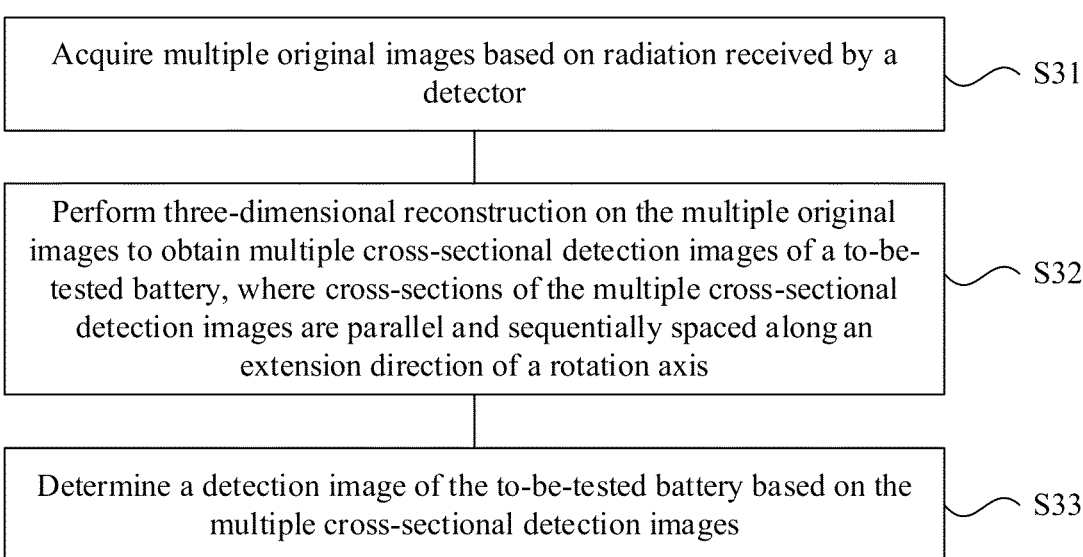
FIG. 10 is a control flowchart of a controller according to some embodiments of this application.

According to some embodiments of this application, FIG. 10 is a control flowchart of a controller according to some embodiments of this application. Step S30 includes configuring the controller to perform the following steps.

Step S31: Acquire multiple original images based on the radiation received by the detector.

Step S32: Perform three-dimensional reconstruction on the multiple original images to obtain multiple cross-sectional detection images of the to-be-tested battery, where the cross-sections of the multiple cross-sectional detection images are parallel and sequentially spaced along the extension direction of the rotation axis.

Step S33: Determine the detection image of the to-be-tested battery based on the multiple cross-sectional detection images.

In these embodiments of this application, the original images are unprocessed images, and at that time, the to-be-tested battery 500 in the images is not clear. After the multiple original images are processed, the to-be-tested battery 500 in the images becomes clearer, making it easier to identify the deformation condition of the to-be-tested battery 500.

Since the multiple original images are acquired during the rotation of the radiation source 420 and the detector 430, an image of the entire to-be-tested battery 500 can be obtained through three-dimensional reconstruction of the multiple original images.

In these embodiments of this application, since the deformation of the to-be-tested battery 500 during use is generally in the form of a recess, the detection of the deformation amount mainly involves measuring a depth of the recess. In a three-dimensional image, it is difficult to measure the deformation amount of the to-be-tested battery 500, that is, it is impossible to determine whether the deformation of the to-be-tested battery is excessive. Cross-sectional detection images, which are two-dimensional images, of the to-be-tested battery are determined based on the three-dimensional image, so that it is easier to identify the depth of the recess in the two-dimensional images, that is, the deformation amount of the to-be-tested battery.

During the use of the battery, the bottom of the battery is more prone to deformation due to bumps, so more attention should be paid to the bottom surface of the battery during detection. Since the bottom surface of the to-be-tested battery 500 is attached to the carrying surface of the carrying platform 440 during detection, the rotation axis O is located on the carrying surface of the carrying platform 440, and the cross-sections of the multiple cross-sectional detection images are sequentially spaced along the extension direction of the rotation axis O. It can be understood that the cross-sectional detection images are perpendicular to the bottom surface of the to-be-tested battery 500, ensuring that information about the bottom surface of the to-be-tested battery 500 can be obtained from each cross-sectional detection image, thereby determining the deformation of the bottom surface of the to-be-tested battery 500.

In these embodiments of this application, by using the above method, clearer detection images can be obtained, making it easier to identify the deformation amount of the to-be-tested battery.

In these embodiments of this application, the number of the multiple acquired original images of the to-be-tested battery 500 can be set according to requirements. A larger number of the acquired original images results in more accurate images of the to-be-tested battery obtained through three-dimensional reconstruction as well as more accurate detection results.

In these embodiments of this application, a target region may be captured from the cross-sectional detection image, so that a required region is captured and copied onto a surrounding region with no information, thereby improving the image processing efficiency and reducing an image storage size.

Figure 11:
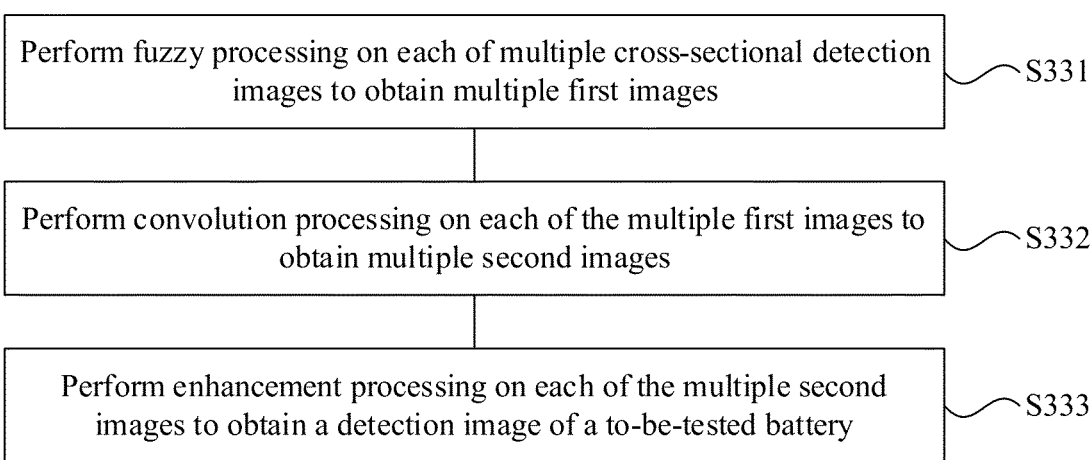
FIG. 11 is a control flowchart of a controller according to some embodiments of this application.

According to some embodiments of this application, FIG. 11 is a control flowchart of a controller according to some embodiments of this application. Step S33 includes configuring the controller to perform the following steps.

Step S331: Perform fuzzy processing on each of the multiple cross-sectional detection images to obtain multiple first images.

Step S332: Perform convolution processing on each of the multiple first images to obtain multiple second images.

Step S333: Perform enhancement processing on each of the multiple second images to obtain the detection image of the to-be-tested battery.

In these embodiments of this application, fuzzy processing involves removing non-essential features such as noise and interference lines from the cross-sectional detection images as well as removing interfering parts outside the to-be-tested battery, making essential features in the first images clearer and increasing a defect recognition degree.

In these embodiments of this application, convolution involves traversing all pixels in the first images with one template, replacing a value of a central pixel of the template with a weighted average grayscale value of pixels in a neighborhood determined by the template. Defect features in the second images that are subjected to convolution processing are more prominent and easier to identify.

In these embodiments of this application, enhancement involves increasing the brightness and contrast of the second images and highlighting contour edges of a battery cell in the to-be-tested battery.

Processing the images using the above method makes the contour edges of the to-be-tested battery in the detection image easier to identify, thereby detecting deformation of the to-be-tested battery 500.

According to some embodiments of this application, a distance between any two adjacent cross-sectional detection images in the multiple cross-sectional detection images is greater than or equal to 0.05 millimeter and less than or equal to 0.5 millimeter.

If the to-be-tested battery 500 has a recess, a depth (deformation amount) of the recess is not the same in every part. After the three-dimensional image of the to-be-tested battery is divided into multiple cross-sectional detection images, each cross-sectional detection image has a corresponding deformation amount at a corresponding position. The largest numerical value among the multiple deformation amounts is a maximum deformation amount of the to-be-tested battery 500.

In these embodiments of this application, if the distance between any two adjacent cross-sectional detection images is set to be too small, for example, less than 0.05 millimeter, the number of cross-sectional detection images processed is too large, leading to increased subsequent computational processes and affecting the detection efficiency. If the distance is set to be too large, for example, greater than 0.5 millimeter, it may cause that the part with a maximum deformation amount is neglected, leading to a significant error in a determined maximum deformation amount and affecting the detection accuracy. The range set in these embodiments of this application can, to some extent, prevent the maximum deformation amount from being neglected while improving the detection efficiency, thereby improving the detection accuracy.

Figure 12:
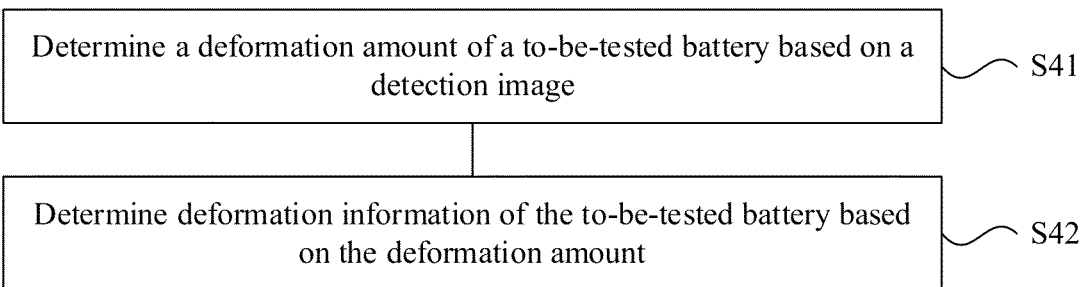
FIG. 12 is a control flowchart of a controller according to some embodiments of this application.

According to some embodiments of this application, FIG. 12 is a control flowchart of a controller according to some embodiments of this application. Step S40 includes configuring the controller to perform the following steps.

Step S41: Determine a deformation amount of the to-be-tested battery based on the detection image.

Step S42: Determine the deformation information of the to-be-tested battery based on the deformation amount.

In these embodiments of this application, the deformation amount of the to-be-tested battery is a standard for determining whether the to-be-tested battery 500 is qualified in deformation detection, and the deformation information of the to-be-tested battery can be determined based on the deformation amount.

Figure 13:
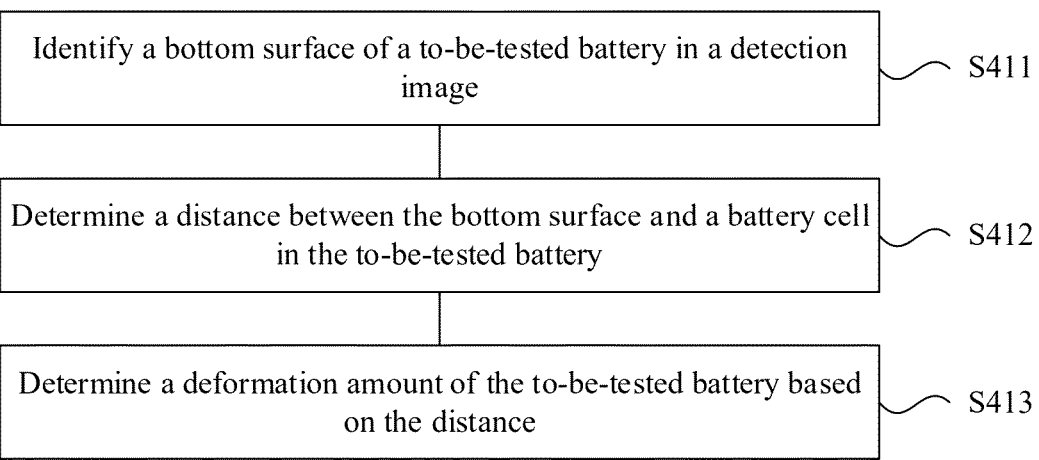
FIG. 13 is a control flowchart of a controller according to some embodiments of this application.

According to some embodiments of this application, FIG. 13 is a control flowchart of a controller according to some embodiments of this application. Step S41 includes configuring the controller to perform the following steps.

Step S411: Identify the bottom surface of the to-be-tested battery in the detection image.

Step S412: Determine a distance between the bottom surface and a battery cell in the to-be-tested battery.

Step S413: Determine the deformation amount of the to-be-tested battery based on the distance.

During the use of the battery, the bottom of the battery is more prone to deformation due to bumps, so more attention should be paid to the bottom surface of the battery during detection. The bottom of the to-be-tested battery has a structural adhesive for connecting the battery cell to the box, so the bottom surface of the to-be-tested battery can be identified through the gluing region of the to-be-tested battery.

If the to-be-tested battery deforms due to bumps or impacts and a recess is formed at the battery cell, the distance between the battery cell and the bottom surface at the deformation position increases. Therefore, the deformation amount of the to-be-tested battery can be determined based on the distance between the bottom surface and the battery cells.

The distance between the bottom surface and the battery cell can be automatically identified through the detection image. For example, a contour of the bottom surface of the to-be-tested battery is first identified, then a contour of the battery cell is identified, and then the distance between the bottom surface of the to-be-tested battery and the battery cell is measured. The distance between the bottom surface and the battery cell in an undeformed state can be directly inputted into the controller 450, and the deformation amount of the to-be-tested battery can be obtained by calculating a difference between the two distances.

In these embodiments of this application, if internal deformation occurs in the to-be-tested battery 500, the distance between the bottom surface and the battery cell in the to-be-tested battery increases, and the deformation amount of the to-be-tested battery can be determined based on the distance between the bottom surface and the battery cell.

According to some embodiments of this application, referring to FIG. 9, the controller is further configured to perform the following step.

Step S71: In response to the deformation amount being greater than a preset value, determine that the to-be-tested battery is unqualified.

In these embodiments of this application, when the deformation amount is greater than the preset value, it indicates that the deformation of the to-be-tested battery 500 is excessive, which affects the stability of the to-be-tested battery 500, and it is determined that the to-be-tested battery 500 is unqualified.

According to some embodiments of this application, referring to FIG. 9, the controller is further configured to perform the following steps.

Step S72: In response to the deformation amount being less than or equal to the preset value, determine that the to-be-tested battery is qualified.

In these embodiments of this application, the controller 450 can control a complete detection of the to-be-tested battery 500 or a detection of a specific abnormal point based on an instruction. A position of the abnormal point can be directly inputted into the controller 450.

In some embodiments of this application, a time for detecting the entire to-be-tested battery 500 is longer than or equal to 100 seconds and less than or equal to 150 seconds, and a time for detecting a single abnormal point is longer than or equal to 20 milliseconds and less than or equal to 50 milliseconds.

According to some embodiments of this application, the preset value is greater than or equal to 1 millimeter (mm) and less than or equal to 3 millimeters.

If the deformation amount of the battery is small, its impact on battery reliability is minimal. If the preset value is set to be too small, for example, less than 1 millimeter, it may cause that too many batteries are deemed unqualified, affecting the yield of the battery. If the preset value is set to be too large, for example, greater than 3 millimeters, it may result in significant deformation in the battery, affecting the reliability of the battery. Setting the preset value to be greater than or equal to 1 millimeter and less than or equal to 3 millimeters guarantees the yield of the battery to some extent and can also improve the reliability of the battery.

An embodiment of this application provides a battery production device including the detection apparatus according to any of the above embodiments.

The battery production device includes the detection apparatus 400, which can be used to perform non-destructive detection on the to-be-tested battery 500 during a production process of the to-be-tested battery 500, and the deformation of the to-be-tested battery 500 can be found in time, thereby eliminating unqualified to-be-tested batteries 500 and improving the quality of the to-be-tested batteries 500 that are delivered.

The detection apparatus of this application is further described below with reference to an exemplary embodiment.

The detection apparatus 400 includes a scanning frame 410, a radiation source 420, a detector 430, and a carrying platform 440. The radiation source 420 and the detector 430 are both connected to the scanning frame 410, and the detector 430 is opposite an emission port of the radiation source 420. The carrying platform 440 is located between the radiation source 420 and the detector 430, where the radiation source 420 and the detector 430 can rotate around a same rotation axis O, and a rotation direction of the radiation source 420 is the same as a rotation direction of the detector 430, such that during rotation, the detector 430 remains opposite the emission port of the radiation source 420, and the carrying platform 440 is located between the radiation source 420 and the detector 430. The carrying platform 440 is configured to hold a to-be-tested battery 500. A rotation angle α of the radiation source 420 satisfies: α≥180°. The carrying platform 440 is movably located between the radiation source 420 and the detector 430, and a movement direction of the carrying platform 440 is parallel to an extension direction of the rotation axis O.

The scanning frame 410 includes a base 411, a scanning ring 412, and a support wheel 413. The base 411 has a mounting groove 4111, and at least a portion of the scanning ring 412 is located in the mounting groove 4111. The support wheel 413 is located in the mounting groove 4111, and the support wheel 413 is connected to the base 411. An outer ring of the scanning ring 412 abuts against the support wheel 413, and the scanning ring 412 can rotate around the rotation axis O, where the radiation source 420 and the detector 430 are both connected to the scanning ring 412, and the radiation source 420 and the detector 430 are located at two opposite ends of a diameter of the scanning ring 412.

In this embodiment of this application, the radiation source 420 may be a linear electron accelerator. For example, a 9 MeV small lightweight linear electron accelerator may be used. The detector 430 may be a linear array detector.

During detection, the to-be-tested battery 500 is placed on the carrying platform 440, and scanning begins progressively from one side edge of the to-be-tested battery 500. The scanning ring 412 drives the linear electron accelerator and the linear array detector to perform rotational scanning. The to-be-tested battery 500 moves forward progressively according to a set detection process until the entire to-be-tested battery 500 is scanned. Then, a test image obtained after completion is subjected to three-dimensional reconstruction, followed by slicing processing at certain intervals to detect a deformation amount at the bottom of a battery cell inside the to-be-tested battery 500. Alternatively, a specific position, such as a deformed position at the bottom of a housing of the to-be-tested battery 500, may be detected, where the to-be-tested battery 500 is moved to a to-be-detected position for scanning, with X-rays being aligned with the deformed position at the bottom of the housing of the to-be-tested battery 500.

In conclusion, it should be noted that the above embodiments are only used to illustrate the technical solutions of this application rather than to limit them. Although this application has been described in detail with reference to the foregoing embodiments, persons of ordinary skill in the art should understand that they may still modify the technical solutions described in the foregoing embodiments or make equivalent substitutions for some or all of the technical features. Such modifications or substitutions do not cause the essence of the corresponding technical solutions to depart from the scope of the technical solutions of the embodiments of this application, and they should be included within the scope of the claims and specification of this application. In particular, as long as there is no structural conflict, the technical features mentioned in the various embodiments can be combined in any manner. This application is not limited to the specific embodiments disclosed in this specification but includes all technical solutions falling within the scope of the claims.

What is claimed is:

1. A detection apparatus for detecting battery deformation, comprising:
   a scanning frame;
   a radiation source connected to the scanning frame;
   a detector connected to the scanning frame, wherein the detector is opposite an emission port of the radiation source; and
   a carrying platform located between the radiation source and the detector, wherein the carrying platform is configured to hold a to-be-tested battery on a carrying surface;
   wherein the radiation source and the detector are arranged for rotating around a same rotation axis, a rotation direction of the radiation source is the same as a rotation direction of the detector, such that during rotation, the detector remains opposite the emission port of the radiation source, and the carrying platform is located between the radiation source and the detector;
   wherein the detection apparatus further comprises:
   a controller, wherein the radiation source is electrically and/or communicatively connected to the controller, and the detector is electrically and/or communicatively connected to the controller;
   wherein the controller is configured to:
   control the radiation source and the detector to rotate around the rotation axis;
   control, when the radiation source rotates, the radiation source to emit radiation that passes through the to-be-tested battery on the carrying platform and that is projected onto the detector;
   acquire a detection image of the to-be-tested battery based on the radiation received by the detector; and
   determine deformation information of the to-be-tested battery based on the detection image;
   wherein the to-be-tested battery comprises a bottom surface, the bottom surface has a gluing region, and the controller is further configured to:
   position the carrying platform such that the rotation axis is located on the carrying surface of the carrying platform during rotation of the radiation source and the detector to control the bottom surface of the to-be-tested battery, said bottom surface being attached to the carrying surface of the carrying platform.

2. The detection apparatus according to claim 1, wherein the scanning frame comprises:
   a base having a mounting groove; and a scanning ring, at least partially located in the mounting groove, wherein the scanning ring is capable of rotating around the rotation axis;

wherein the radiation source and the detector are both connected to the scanning ring, and the radiation source and the detector are located at two opposite ends of a diameter of the scanning ring.

3. The detection apparatus according to claim 2, wherein the scanning frame further comprises:

a support wheel located in the mounting groove, wherein the support wheel is connected to the base, and an outer ring of the scanning ring abuts against the support wheel.

4. The detection apparatus according to claim 1, wherein a rotation angle $\alpha$ of the radiation source satisfies: $\alpha \geq 180°$.

5. The detection apparatus according to claim 1, wherein the carrying platform is movably located between the radiation source and the detector, and a movement direction of the carrying platform is parallel to an extension direction of the rotation axis.

6. The detection apparatus according to claim 1, wherein when the scanning frame comprises a base and a scanning ring, the controlling the radiation source and the detector to rotate around the rotation axis comprises configuring the controller to:

control the scanning ring to rotate around the rotation axis.

7. The detection apparatus according to claim 1, wherein when the carrying platform is capable of moving along an extension direction of the rotation axis, the controller is further configured to:

control the carrying platform to move along the extension direction of the rotation axis, such that the carrying platform is located between the radiation source and the detector.

8. The detection apparatus according to claim 1, wherein the acquiring the detection image of the to-be-tested battery based on the radiation received by the detector comprises configuring the controller to:

acquire multiple original images based on the radiation received by the detector;

perform three-dimensional reconstruction on the multiple original images to obtain multiple cross-sectional detection images of the to-be-tested battery, wherein cross-sections of the multiple cross-sectional detection images are parallel and sequentially spaced along an extension direction of the rotation axis; and determine the detection image of the to-be-tested battery based on the multiple cross-sectional detection images.

9. The detection apparatus according to claim 8, wherein the determining the detection image of the to-be-tested battery based on the multiple cross-sectional detection images comprises configuring the controller to:

perform fuzzy processing on each of the multiple cross-sectional detection images to obtain multiple first images;

perform convolution processing on each of the multiple first images to obtain multiple second images; and perform enhancement processing on each of the multiple second images to obtain the detection image of the to-be-tested battery.

10. The detection apparatus according to claim 8, wherein a distance between any two adjacent cross-sectional detection images in the multiple cross-sectional detection images is greater than or equal to 0.05 millimeter and less than or equal to 0.5 millimeter.

11. The detection apparatus according to claim 1, wherein the determining the deformation information of the to-be-tested battery based on the detection image comprises configuring the controller to:

determine a deformation amount of the to-be-tested battery based on the detection image; and determine the deformation information of the to-be-tested battery based on the deformation amount.

12. The detection apparatus according to claim 11, wherein the determining the deformation amount of the to-be-tested battery based on the detection image comprises configuring the controller to:

identify a bottom surface of the to-be-tested battery in the detection image;

determine a distance between the bottom surface and a battery cell in the to-be-tested battery; and determine the deformation amount of the to-be-tested battery based on the distance.

13. The detection apparatus according to claim 11, wherein the controller is further configured to:

determine, in response to the deformation amount being greater than a preset value, that the to-be-tested battery is unqualified.

14. The detection apparatus according to claim 13, wherein the preset value is greater than or equal to 1 millimeter and less than or equal to 3 millimeters.

15. A battery production device, comprising the detection apparatus according to claim 1.

16. A detection apparatus for detecting battery deformation, comprising:

a scanning frame;

a radiation source connected to the scanning frame;

a detector connected to the scanning frame, wherein the detector is opposite an emission port of the radiation source; and a carrying platform located between the radiation source and the detector, wherein the carrying platform is configured to hold a to-be-tested battery on a carrying surface;

wherein the radiation source and the detector are arranged for rotating around a same rotation axis, a rotation direction of the radiation source is the same as a rotation direction of the detector, such that during rotation, the detector remains opposite the emission port of the radiation source, and the carrying platform is located between the radiation source and the detector;

wherein the carrying surface of the carrying platform is configured to hold a bottom surface of the to-be-tested battery, and wherein the carrying platform is arranged such that the rotation axis is located on the carrying surface of the carrying platform during rotation of the radiation source and the detector around the rotation axis.

* * * * *